Dec. 11, 1928.
S. A. MENCZER
1,694,552
GLARE SHIELD FOR MOTOR VEHICLES
Filed May 7, 1927
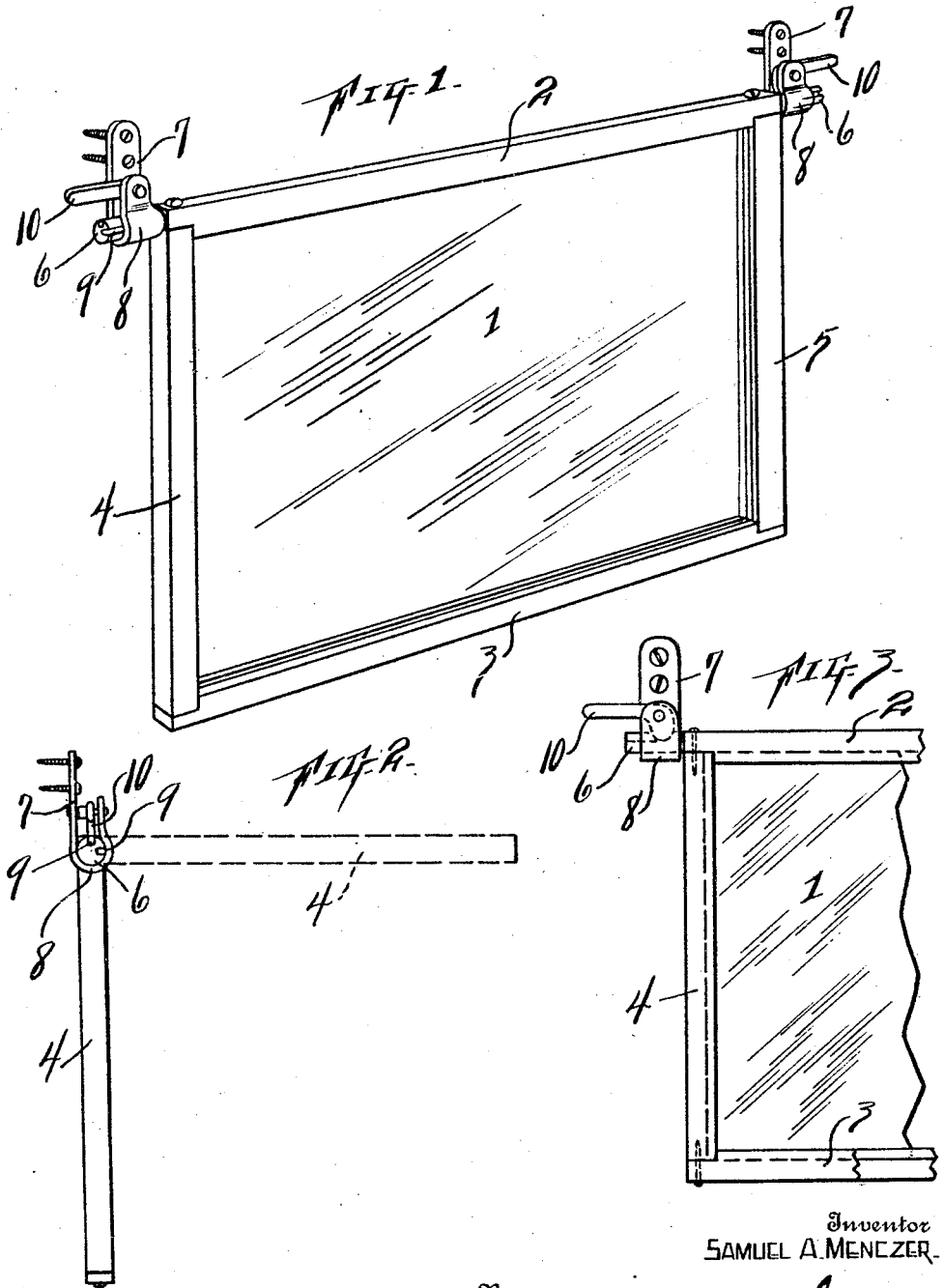
Inventor
SAMUEL A. MENCZER
By
A. L. Jackson
Attorney

UNITED STATES PATENT OFFICE.

SAMUEL A. MENCZER, OF FORT WORTH, TEXAS.

GLARE SHIELD FOR MOTOR VEHICLES.

Application filed May 7, 1927. Serial No. 189,644.

My invention relates to glare shields for motor vehicles and more particularly to glare shields for use in connection with wind shields of motor vehicles; and the object is to provide a simple device which is held normally out of operative position and which can be quickly and easily brought in position to shield the eyes of the driver from abnormally bright headlights of approaching vehicles and also to shield the eyes of the driver from sun-light. Other objects and advantages will be fully explained in the following description and the invention will be more particularly pointed out in the claim.

Reference is had to the accompanying drawings which form a part of this application.

Fig. 1 is an elevation of the improved wind-shield in the operative position.

Fig. 2 is an edge view of the same, the dotted outline showing the position when held out of operative position.

Fig. 3 is a broken view, being a detail view of the means for mounting the shield on a vehicle.

Similar characters of reference are used to indicate the same parts throughout the several views.

This invention includes a small framed piece of glass or transparent material framed to be mounted on the frame of a motor vehicle, preferably just above the wind-shield. The drawings show a plate of glass 1 which is provided with upper and lower frame pieces 2 and 3 and side frame pieces 4 and 5. The glass is to be caught in grooves in the frame members in the usual manner. The upper frame member 2 has extended pivot lugs 6 for mounting the glare shield. Bracket hinges 7 are provided with bearings 8 for engaging the pivot lugs 6. The ends of the lugs 6 have a plurality of grooves 9 and a latch 10 is pivotally mounted in the bracket hinge 7 and is adapted to engage any one of the grooves 9 in the lugs 6. It is preferable to make the shield just large enough to shield the eyes of the driver and not to extend it entirely across the wind-shield. With the construction shown, the shield can be brought to the vertical position and the latch 10 swung into a groove 9 to hold the shield in front of the eyes of the driver. If there is no use for the shield, the latch 10 can be released and the shield swung upwardly towards the top of the vehicle and locked in the upper position by the same latch 10. The plate 1 can be stained in any suitable manner to protect the eyes from glare. The plate 1 may simply be frosted to answer the purpose. Any material may be used to partly obscure the passage of bright lights through the shield.

What I claim, is,—

A glare shield for motor vehicles comprising a stained plate and a frame therefor, pivot lugs rigid with said frame and provided with grooves in the ends thereof, hooked bearing brackets for pivotally attaching the shield to a motor vehicle frame, latches adapted to engage the grooves in said lugs for holding said shield at different positions, and pivot bolts projected through said brackets and their beaks for pivotally connecting said latches to said brackets.

In testimony whereof, I set my hand, this 28th day of February, 1927.

SAMUEL A. MENCZER.